(12) United States Patent
Walker et al.

(10) Patent No.: US 8,819,711 B2
(45) Date of Patent: Aug. 26, 2014

(54) HIERARCHICAL PROGRAM PACKAGES FOR USER TERMINAL SUBSCRIBABLE SERVICES

(75) Inventors: Gordon Kent Walker, Poway, CA (US); Bruce Collins, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 11/120,584

(22) Filed: May 2, 2005

(65) Prior Publication Data
US 2006/0014535 A1    Jan. 19, 2006

Related U.S. Application Data (60) Provisional application No. 60/568,180, filed on May 4, 2004, provisional application No. 60/625,531, filed on Nov. 4, 2004.

(51) Int. Cl.
*H04N 7/16* (2011.01)

(52) U.S. Cl.
USPC .................................. 725/1; 725/5

(58) Field of Classification Search
CPC ...................... H04N 21/2543; H04N 21/26225
USPC .................................. 725/1, 87, 5
See application file for complete search history.

(56) References Cited

U.S. PATENT DOCUMENTS

| | | | |
|---|---|---|---|
| 6,256,498 B1 * | 7/2001 | Ludwig | 455/433 |
| 6,539,548 B1 * | 3/2003 | Hendricks et al. | 725/109 |
| 6,628,934 B2 * | 9/2003 | Rosenberg et al. | 455/411 |
| 6,788,926 B1 * | 9/2004 | Frangione et al. | 455/405 |
| 7,176,961 B2 * | 2/2007 | Shimamura | 348/207.99 |
| 7,805,315 B2 * | 9/2010 | Goel | 705/1.1 |
| 2002/0013944 A1 * | 1/2002 | Gordon et al. | 725/39 |
| 2002/0107918 A1 * | 8/2002 | Shaffer et al. | 709/203 |
| 2002/0151327 A1 | 10/2002 | Levitt | |
| 2002/0156879 A1 | 10/2002 | Delany et al. | 709/223 |
| 2002/0160748 A1 | 10/2002 | Rahman et al. | |
| 2002/0174433 A1 | 11/2002 | Baumgartner et al. | |
| 2003/0032409 A1 | 2/2003 | Hutcheson et al. | |

(Continued)

FOREIGN PATENT DOCUMENTS

| JP | 2000083285 A | 3/2000 |
|---|---|---|
| JP | 2001285191 A | 10/2001 |

(Continued)

OTHER PUBLICATIONS

International Search Report—PCT/US05/015456, International Search Authority—European Patent Office, Aug. 1, 2005.

(Continued)

*Primary Examiner* — Nasser Goodarzi
*Assistant Examiner* — Hyun Hong
(74) *Attorney, Agent, or Firm* — The Marbury Law Group, PLLC (57) ABSTRACT

A wireless communication method for modifying a subscription that includes, receiving subscription information, demodulating the subscription information according to a wireless scheme, displaying a set of available program packages for subscription using the demodulated subscription information and allowing a selection of one or more displayed packages, wherein the subscription is modified as a result of the selection.

78 Claims, 8 Drawing Sheets

(56) References Cited

U.S. PATENT DOCUMENTS

2003/0046683 A1* 3/2003 Jutzi .................................. 725/2
2003/0117445 A1   6/2003 Hendricks et al. ............ 345/810
2003/0203731 A1  10/2003 King et al.
2004/0083492 A1*  4/2004 Goode et al. ..................... 725/87
2004/0177356 A1*  9/2004 Westendorf et al. .......... 717/177
2005/0096032 A1*  5/2005 Benco et al. ............... 455/422.1

FOREIGN PATENT DOCUMENTS

| TW | 447209 | 7/2001 |
|---|---|---|
| TW | 571596 B | 1/2004 |
| WO | WO 00/39988 | 7/2000 |
| WO | WO 03/050743 A1 | 6/2003 |

OTHER PUBLICATIONS

Written Opinion—PCT/US05/015456, International Search Authority—European Patent Office, Aug. 1, 2005.
International Preliminary Report on Patentability—PCT/US05/015456, The International Bureau of WIPO—Geneva, Switzerland, Nov. 7, 2006.
European Search Report—EP10011619, Search Authority—Munich Patent Office, Dec. 6, 2010.
Taiwan Search Report—TW094114413—TIPO—May 17, 2012.

* cited by examiner

HIERARCHICAL PROGRAM PACKAGES FOR USER TERMINAL SUBSCRIBABLE SERVICES

CLAIM OF PRIORITY UNDER 35 U.S.C. §119

The present Application for Patent, claims priority to Provisional Application No. 60/568,180 entitled "MEDIAFLO HIERARICAL PACKAGES" filed May 4, 2004 and Provisional Application No. 60/625,531 entitled "MEDIAFLO HIERARICAL PACKAGES FOR A USER TERMINAL SUBSCRIBABLE SERVICES WITH LOCATION DEPENDENCY" filed Nov. 4, 2004 assigned to the assignee hereof and hereby expressly incorporated by reference herein.

BACKGROUND

1. Field

This invention relates to methods, apparatus and systems for subscribing to multimedia programming and packaged content.

2. Background

Second generation (2G) networks include Code Division Multiple Access (CDMA) and Global System for Mobile Communications (GSM) networks and provide a wireless connection for digital voice encoding. Third Generation (3G) mobile networks offer cellular data rates that approach a wired broadband connection. These 3G mobile networks are robust delivery mechanisms for a rich variety of services that are being offered around the world. From CDMA 2000-based networks to those based on WCDMA (Wide-band Code-Division Multiple Access), cellular users are able to access services and information that were once only available from a wired desktop computer. Using third generation technologies it is now possible to deliver applications and multimedia services, such as streaming video files and interactive television programming, to these mobile devices.

WCDMA is also referred to as Universal Mobile Telecommunications System (UMTS) and along with CDMA 2000 represent an evolution in terms of services and data speeds from today's 2G mobile networks. UMTS and CDMA 2000 third generation mobile technologies identified by the ITU (International Telecommunication Union) are expected to include capabilities and features such as: enhanced multimedia (voice, data, video, and remote control), usability on all popular modes (cellular telephone, e-mail, paging, fax, videoconferencing, and Web browsing), broad bandwidth and high speed (upwards of 2 Mbps) routing flexibility (repeater, satellite, LAN), operation at approximately 2 GHz frequencies, and roaming capability throughout Europe, Japan, and North America.

Today's mobile customers have already demonstrated a desire for "non-voice" and other new services. More than 24 billion text messages are sent every month, and now customers are choosing Multimedia Messaging Service (MMS), an evolution of text messaging that adds pictures and sound elements. CDMA 2000 and UMTS will build on these first steps towards a mobile multimedia future, allowing operators to offer new services to consumers.

The availability of these robust mobile networks and sophisticated handheld devices, coupled with increasing consumer demand for media content, has generated a need for improved methods of subscribing to multimedia programming and packaged content at a mobile device.

SUMMARY

A media distribution method and apparatus is described that offers improved subscription capabilities to a mobile device. The mobile device that displays video and audio programming allows subscription and un-subscription to packages of video and audio programming without involvement of customer service personnel. Subscription information is transferred to the mobile device. The information can be in the form of a set and cost of all subscription packages, a set and cost of available packages, or an application that is capable of determining the set and cost of available packages. Information regarding the available packages is displayed at the mobile device. The mobile device is able to accept a selection of one or more displayed packages and as a result of the selection, modify the subscription. The modification can add and/or cancel one or more packages from subscription.

DETAILED DESCRIPTION

The disclosed embodiments are designed to enable a user of a wireless mobile device to modify a subscription of media services accessible at the mobile device without the assistance of a customer service representative. The service provider transmits subscription information to the mobile device. The mobile device displays the subscription information and allows a selection of packages available for subscription. The subscription will then be modified to reflect the one or more selections, for adding or canceling one or more program packages. The mobile device can display a cost of the present subscription state and can display a cost of the subscription if modified relative to the selected program packages. As a result of the selection process occurring at the mobile device, the subscription is modified without the assistance of a customer service representative.

Figure 1:
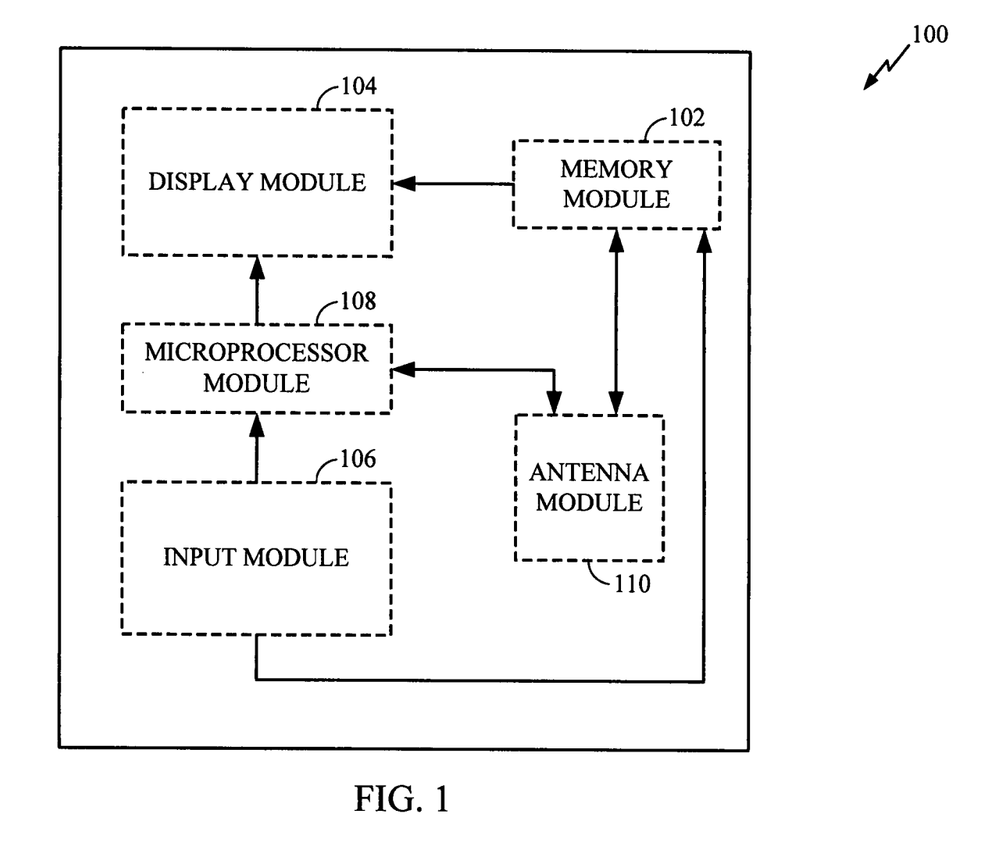
FIG. 1 is a block diagram of one example of a mobile device for a wireless network.

FIG. 1 is a block diagram of one example of a mobile device for a wireless network. The mobile device 100 includes one or more memory modules 102, a display module 104, an input module 106 such as, for example, an alphanumeric key arrangement or a joystick and at least one microprocessor 108. A set of instructions, such as a software application, is loaded onto the one or more memory modules 102, from which at least one microprocessor module 108 generates a variety of subscription information for the display module 104. The input module 106 allows a subscriber to interact with the mobile device 100. One or more antenna modules 110 can send and receive wireless information. From the displayed subscription information a selection can be made using the mobile device 100 to perform the improved subscription methods. The methods can be practiced on such mobile devices as, for example, a PDA, a cell phone or a personal media player. Additional details about implementing the methods on the mobile device 100 are provided below.

Figure 2:
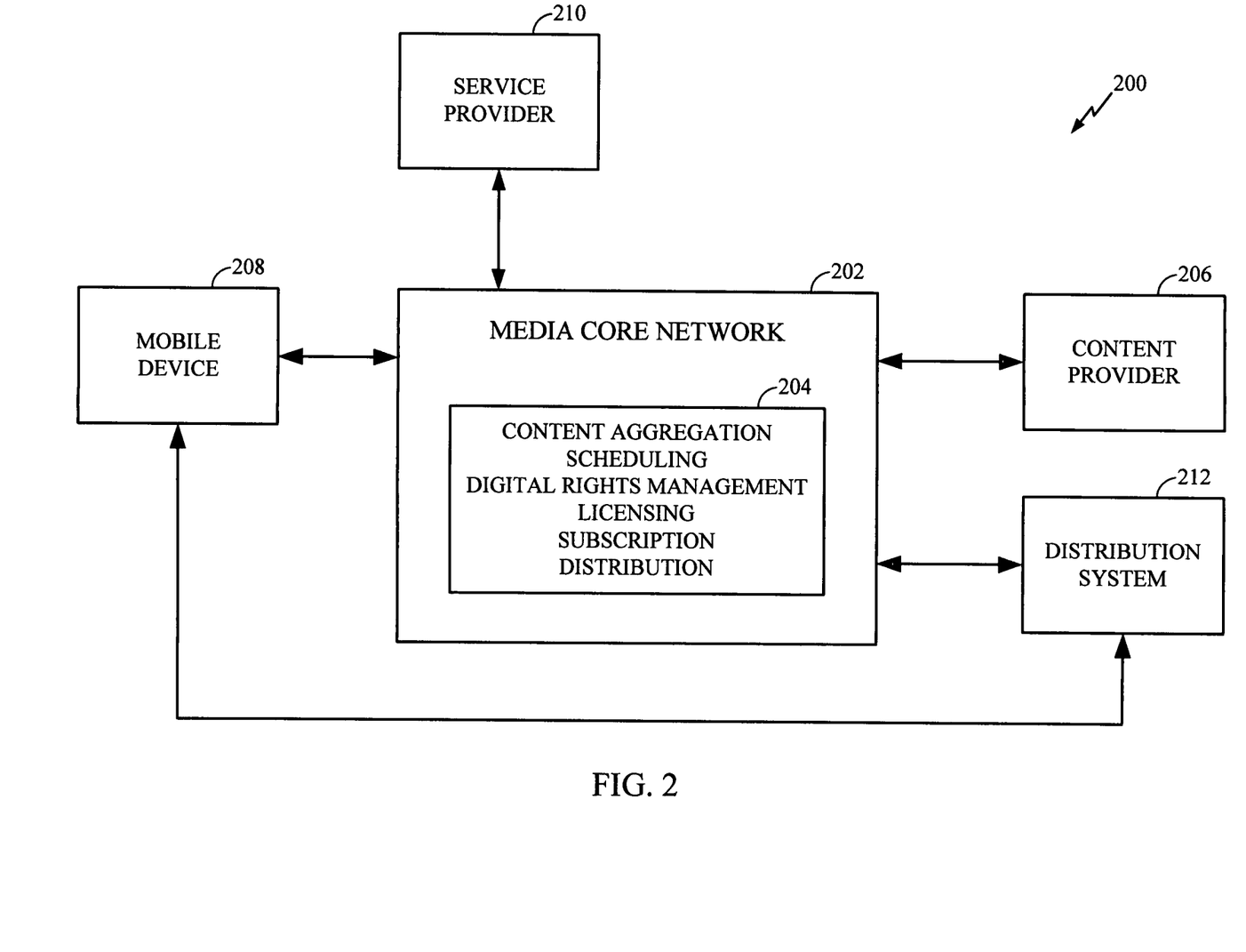
FIG. 2 is a block diagram of one example of a media distribution system that can be used to provide an improved subscription method.

FIG. 2 is a block diagram of one example of a media distribution system that can be used to provide the improved subscription method. The media distribution system 200 includes a media core network 202, at least one content provider 206, a mobile device 208, a service provider 210, and a distribution system 212. The media core network 202 contains server components 204 that collectively provide media content aggregation from the various content providers 206, scheduling of the media, managing the digital rights of the media content along with the licensing, subscription and media distribution. The distribution system 212 manages this transfer, i.e., to the content provider 206, the mobile device 208 and the service provider (retail provider) 210. The distribution system 212 also distributes software applications to the mobile device 208 as well as manages billing and other accounting requirements. The media core network 202 sends the media content to a mobile device 208, along with associated programming information, based on a delivery schedule.

In this example, the media distribution system 200 is a wireless communications system. By way of a specific example, the embodiment is discussed in relation to a CDMA communication system. The principles of CDMA communication systems, and in particular the general principles for generation of spread spectrum signals for transmission over a communication channel are known to one of ordinary skill in the art. For any wireless communication system described or referred to, it is to be understood that it refers both to the digital signal technology as well as the network for carrying the signal. Instead of CDMA, the wireless network can be a frequency division multiple access (FDMA) system, a time division multiple access (TDMA) system such as GSM, GSM/GPRS (General Packet Radio Service), EDGE (Enhanced Data GSM Environment) or TETRA (Terrestrial Trunked Radio, a mobile telephone technology for the service industry), WCDMA or other high data rate (1×EV-DO or 1×EV-DO Gold Multicast) systems, or in general any wireless communication system.

A service provider 210 operates the media distribution system 200 to control all services offered by the content providers 206. The media core network 202 provides services grouped in the form of program packages to a subscriber's mobile device 208. The media core network 202 provides an interface for the service provider 210 to create and define the program packages and services. The services offered by the content providers 206 can be configured by the media core network 202 into program packages and/or individual services of media to be offered at the subscriber's mobile device 208. From this total set of program packages generated at the media core network 202, a set of program packages available to the mobile device 208 is determined. The availability of program packages can be based on any of a variety of factors including the geographic location of the subscriber's mailing address. This set of media programming, in the form of program packages, can be transferred to the mobile device 208 as a set of available packages and costs. Alternatively, a software application can be transferred to the mobile device 208 that is capable of generating the set of available packages and associated costs of service at the mobile device 208. Other software applications can be developed and transferred to the mobile device 208 by the media core network 202. The software, once installed on the mobile device 208, can determine the available program packages and the associated costs. With the media distribution system 200 functioning, a mobile device can subscribe and un-subscribe to program packages and services, can view the subscribed media and can be provided with updates to the available packages and services. Additional details about performing the methods in the context of the CDMA media distribution system 200 are discussed below.

Figure 3:
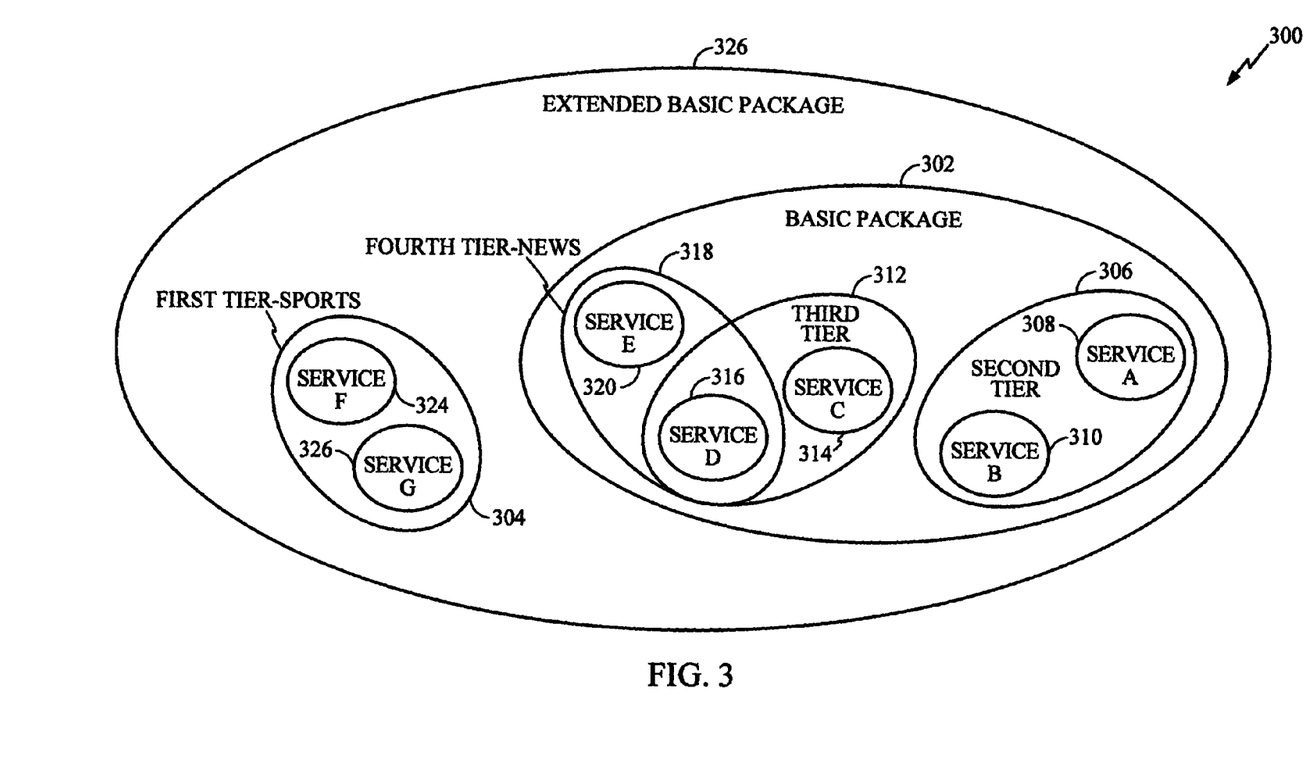
FIG. 3 is an illustration of an example of a set of program packages.

FIG. 3 is an illustration of an example of a set of program packages. The set of program packages 300 includes a basic package 302, a first-tier sports package 304, and an extended basic package 326. The basic package 302 contains a second tier 306 providing service A (308) and service B (310), a third tier 312 providing service C (314) and service D (316), and a forth tier 318 for news providing news service E (320) and service D (316). The first-tier sports package 304 contains service F (324) and service G (326). The extended basic package 326 contains all of the basic package 302 services along with services in the first tier sports package 304.

A Tier is a grouping of one or more services. A program package can be made up of one or more tiers, one or more services, or a combination of both. A service can be common to multiple packages and/or tiers as shown with service D (316), which is common to the third tier 312 and the fourth tier news package 318.

The hierarchical package architecture of this example is enabled by the package referencing scheme. Program packages reference one or more media items (i.e., packages, tier, service, etc.), and this "reference" determines the package's availability for subscription. For instance, if the sports package 304 references only the Basic Package 302, then the sports package 304 is only available to a subscriber of the Basic Package 302. If, however, the sports package 304 references the Basic Package 302 and the news package (Fourth Tier) 318, then the sports package 304 is available to a subscriber of either the Basic Package 302 or the news package 318. In the later scenario, a subscriber to the news package 318 that does not subscribe to the rest of the Basic Package 302 would still have the sports package 304 available for subscription.

Figure 4A:
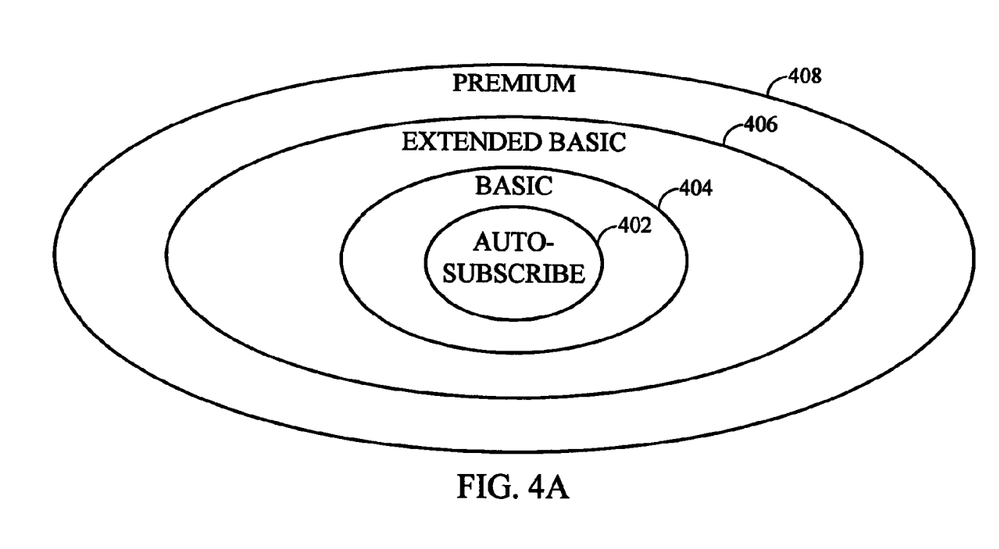
FIGS. 4A and 4B illustrate one example of direct package subscription.
Figure 4B:
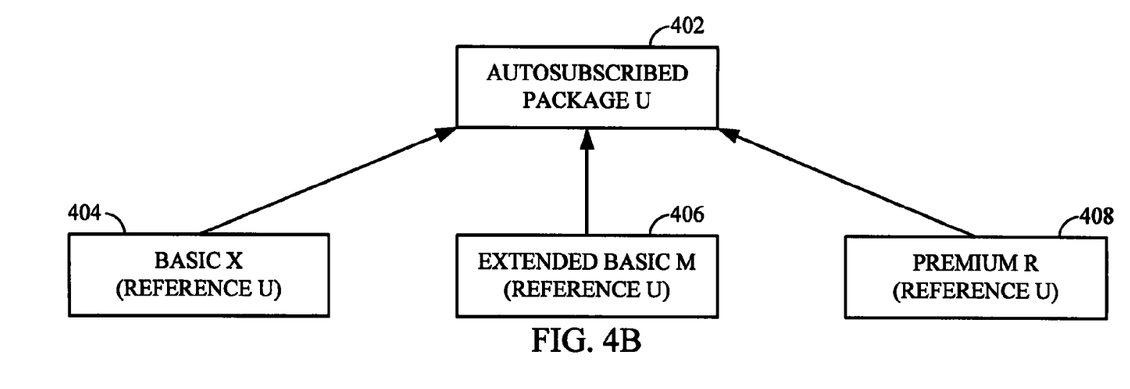

FIGS. 4A and 4B illustrate one example of direct package subscription. Four packages 402, 404, 406, and 408 are shown as nested in the illustration of a direct package subscription scheme 400. An auto-subscribe package 402 is automatically installed on a remote device 100 (FIG. 1). The auto-subscribe package 402 will provide only the basic services to initiate a media subscription, such as, for example, a set of available packages, banners, advertisements, and so forth. Moreover, auto-subscribe package 402 may not be removable. The direct package subscription scheme allows the subscriber to subscribe to any package directly from the auto-subscribed package state. To subscribe to a minimum of media services, the subscriber can select a basic package 404. The subscriber can also select either the extended basic package 406 or the premium package 408 without selecting the basic package 404.

As shown in FIG. 4B, in the direct subscription scheme, the basic, extended, and premium packages 404, 406, and 408 all reference the auto-subscribe package 402, and thus, are available for selection directly by a subscriber of the auto-subscribe package 402. With such a hierarchy, a mobile device 100 (FIG. 1) can allow a selection for subscription of the basic package 404, the extended basic package 406, or the premium package 408 once the auto-subscribe package 402 is installed. This avoids a subscriber having to first subscribe to the basic package 404 and then the extended basic package 406 before being allowed to add the premium package 408. However, because additional packages 404, 406, and 408 reference only auto-subscribe package 402, to change the subscription from one of the additional packages, a subscriber to any of these three additional packages 404, 406, and 408 would first have to cancel the existing package subscription and then add the desired additional package from the auto-subscribe state. For example, in the direct subscription scheme, a user of a mobile device 100 (FIG. 1) subscribing to the basic package 404 would have to cancel the basic package 404 subscription in order to subscribe to the extended basic package 408. However, such cancellation could be made automatic with the new subscription selection.

Figure 5A:
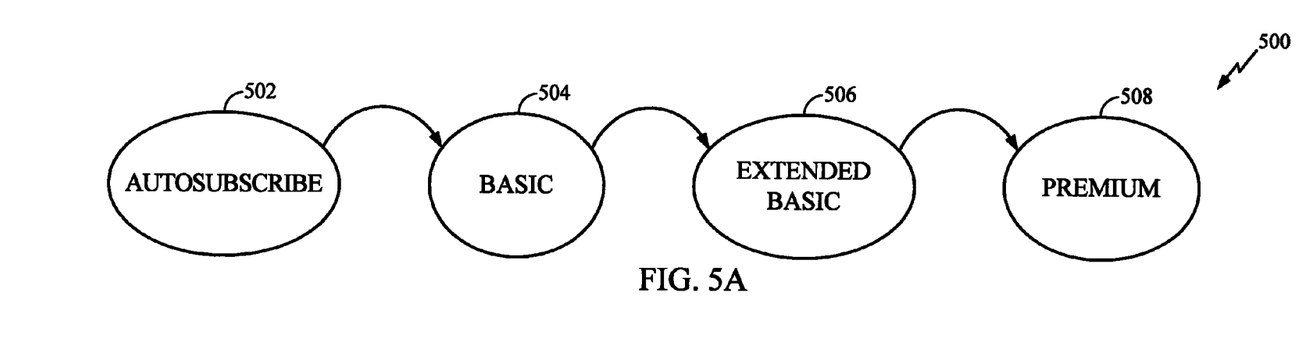
FIGS. 5A and 5B illustrate one example of an incremental subscription scheme.
Figure 5B:
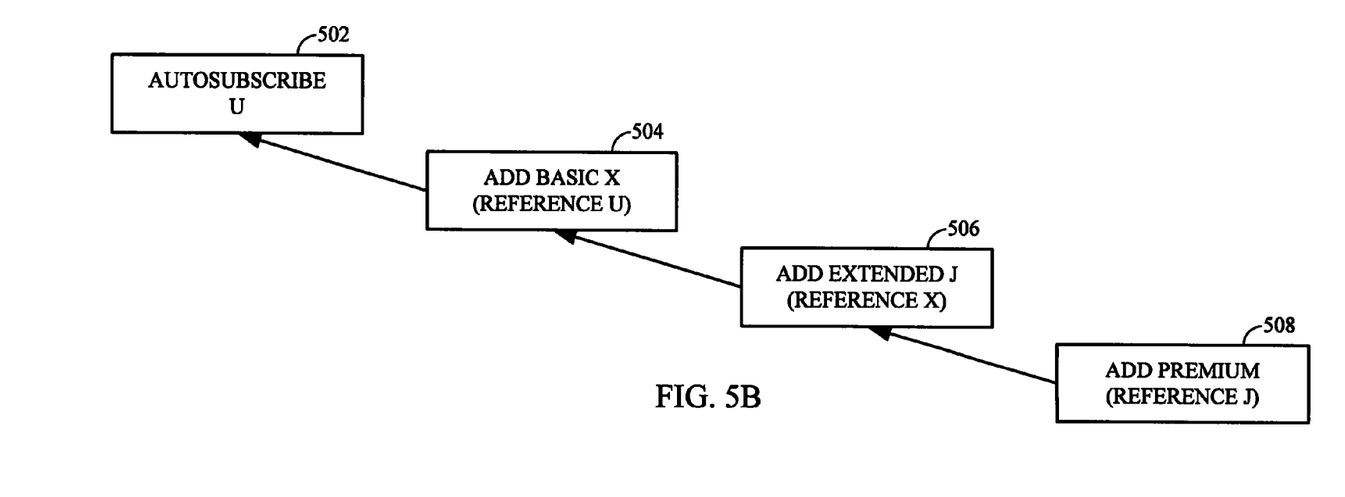

FIGS. 5A and 5B illustrate one example of an incremental package subscription scheme. To implement an incremental subscription scheme 500, the packages form a chain. Using this scheme 500, a mobile device 100 (FIG. 1) requires subscription to an auto-subscribe package 502 before subscription to a basic package 504 becomes available. Subscription to the basic package 504 would be required before subscription to an extended basic package 506 becomes available, and the extended basic package 506 is required before subscription to a premium package 508 becomes available. As shown in FIG. 5B, in the incremental scheme 500 each package references the immediately preceding package in the chain, and therefore, packages can be upgraded one step at a time without having to unsubscribe. However, under the incremental subscription scheme 500, the extended basic package 506 cannot be subscribed to directly from the auto-subscribe state because package 506 does not reference the auto-subscribe package 502. Similarly, the premium package 508 cannot be directly subscribed from either the auto-subscribe or basic subscription states because package 508 does not reference either the auto-subscribe package 502 or basic package 504.

In one example, the auto-subscribe package 502 can be provided at no cost since the auto-subscribed package 502 contains services that are necessary to initiate a media subscription, while the other packages 504-508 each have a cost associated with their subscription. The basic package 504 provides minimal services but with each succeeding package 506 & 508, more services are added. Each higher-level package 506 & 508 may or may not contain all of the services of the lower 504 & 506 packages.

Figure 6:
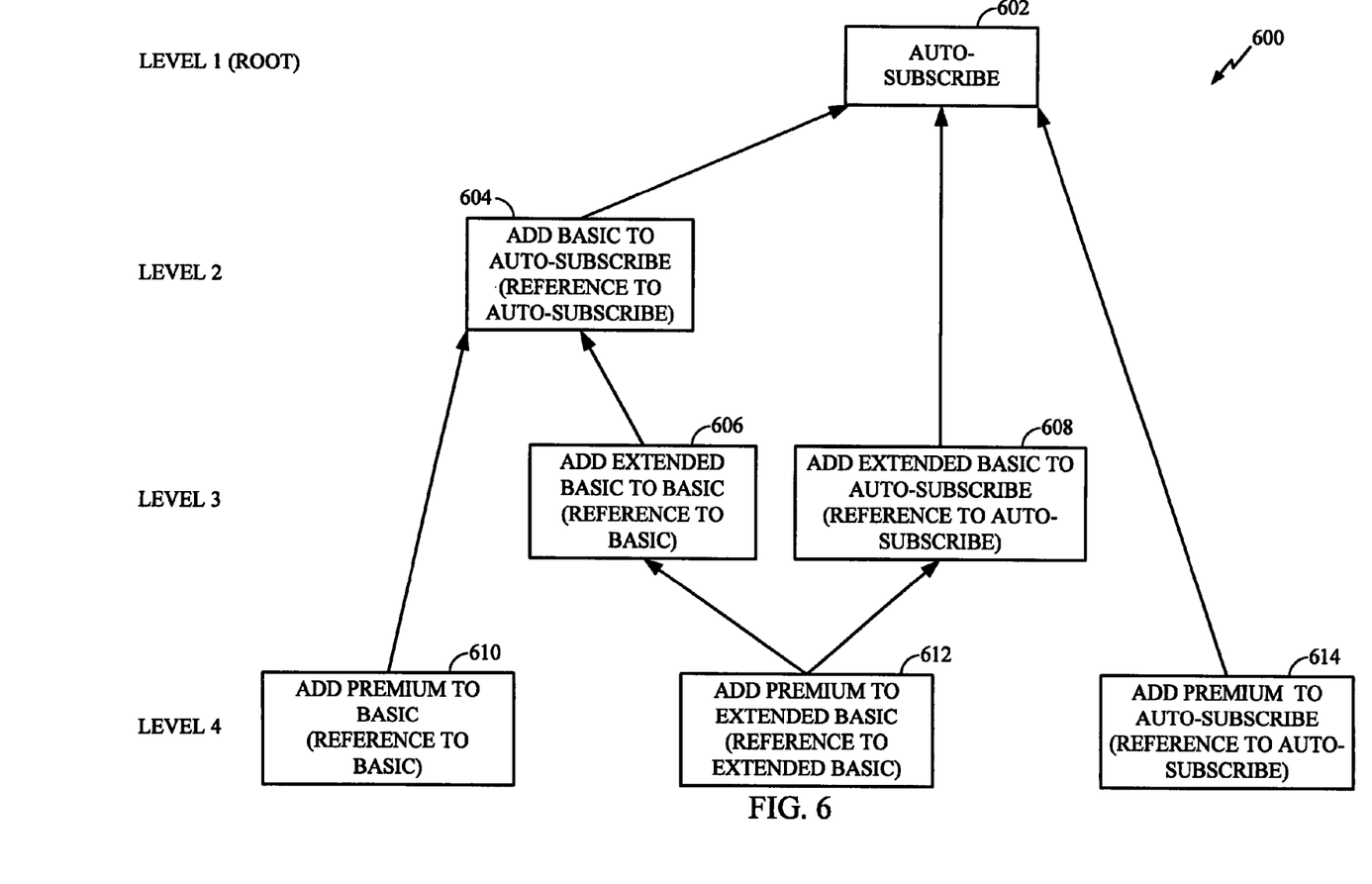
FIG. 6 is an illustration of one example of a hierarchical subscription tree that includes both direct and incremental subscription.

FIG. 6 is an illustration of one example of a hierarchical subscription tree that includes both direct and incremental package subscription. A tree is a group of packages that reference one another. A package tree 600 incorporates both direct and incremental package subscriptions to allow a mobile device 100 (FIG. 1) to subscribe to any package directly or to upgrade incrementally or a combination of both with the benefit of increased flexibility. With this example, all packages reference all lower level packages and in this way, any package can be added to any other package currently being subscribed. For example, beginning with step 602, a subscription to the auto-subscribe package is provided to the mobile device. The auto-subscribe package is the root package for the subscription tree 600. Each subscription tree has a root package, which is a package that is referenced by other packages in the tree but itself does not reference any other package. At step 604, a basic package, which references the auto-subscribe root package, is subscribed. At step 606, a subscriber of the basic package can add a first extended basic package because it references the basic package. Additionally, as shown at step 608, because the extended basic package also references the auto-subscribe root package, the mobile device 100 can be used to subscribe to the extended basic package directly from the auto-subscribe package state without first adding the basic package. The extended basic package, which includes access to all the services and programming of the basic package, can be added directly to the auto-subscribe package.

In this example, a premium package can be added several ways depending on the current subscription state because the premium package references all of the other packages in tree 600. At step 610, a subscriber to the basic package adds a subscription via the remote device 100 directly to the premium package. Since the premium package references the basic package it is available for subscription without having to first unsubscribe from the basic package. At step 612, a subscriber to the extended basic package adds a subscription directly to the premium package. Since the premium package also references the extended basic package, it is available for subscription without having to first unsubscribe from the extended basic package. At step 614, a subscriber to the auto-subscribe package adds a subscription directly to the premium package. Since the premium package also references the auto-subscribe package, it is available for subscription directly from the auto-subscribe state.

Figure 7:
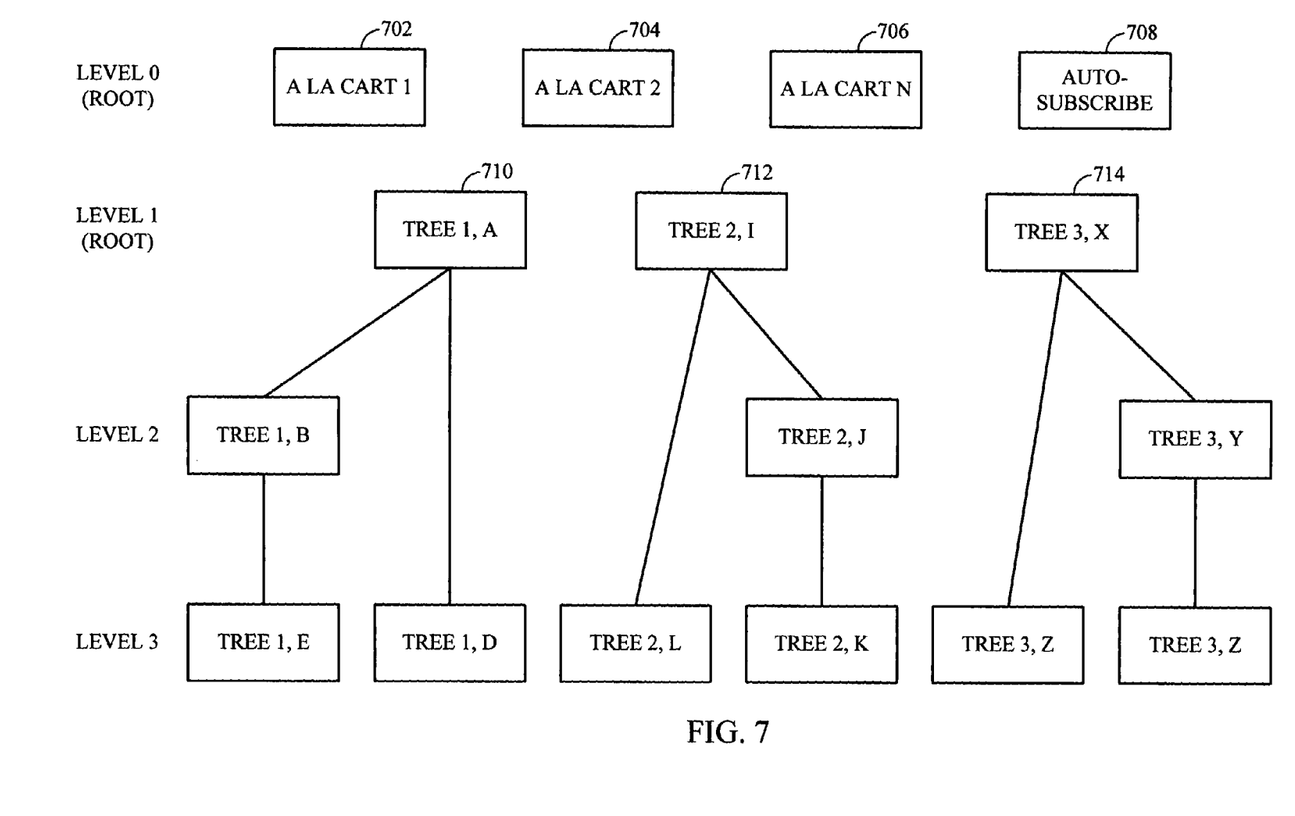
FIG. 7 is an illustration of one example of a hierarchical subscription scheme.

FIG. 7 is an illustration of an example of a hierarchical subscription scheme. The subscription scheme in FIG. 7 includes three a la cart packages 702, 704, and 706, an auto-subscribe package 708, and three hierarchical subscription trees 710, 712, and 714. Each hierarchical subscription tree includes three levels of program packages that can be both directly and incrementally subscribed as described above with respect to FIG. 6. In this example, each tree 710, 712, and 714 is independent of another, i.e., the packages of one tree do not reference packages from another tree. Within each hierarchical subscription tree, packages identify their tree by the package ID of their respective root package. Thus, a service provider may offer several subscription offerings, where each tree represents subscription options for a specific geographic location. For example, hierarchical subscription tree 710 may be designated for mobile devices with billing addresses in the western United States, while trees 712 and 714 are designated for other regions of the country. A user that is allowed access to the western United States subscription tree is allowed to subscribe to the root package "Tree 1,A." Once subscribed to the root, the user is allowed to subscribe to any program package in that tree. Other criteria can be used by the service providers to determine whether to provide different subscription schemes to different users and how to allocate those schemes among the different users.

As shown in FIG. 7, a la cart packages 702, 704 and 706 do not reference any other packages, and no packages reference a la cart packages. These a la cart packages are available for subscription to anyone at any subscription state.

It is possible to implement a subscription scheme where packages become suppressed or excluded from a user's view. This is useful for suppressing previously available packages or packages that the service provider determines should only be visible for users at certain subscription states. One such example uses mutually exclusive packages. A mutually exclusive package is a package that when subscribed causes one or more other packages to be suppressed, i.e. removed from a user's subscription options. In one example a mutually exclusive package includes a list of packages that it suppresses. Thus, for instance, if the service provider wants the basic package to be suppressed from a user's subscription options when the user subscribes to the extended basic package, the extended basic package would reference the basic package in its "suppress list." Alternatively, each package can include an ID for a mutually exclusive set. Thus, a subscription to a package would suppress all other packages having the same mutually exclusive set ID. If packages in the mutually exclusive set are Root packages, then a selection from the set causes the remaining Root packages in the mutually exclusive set to become suppressed. Once the other Root packages become suppressed, the subscription trees associated with the suppressed Root packages would also become unavailable for user subscription as a result.

Figure 8:
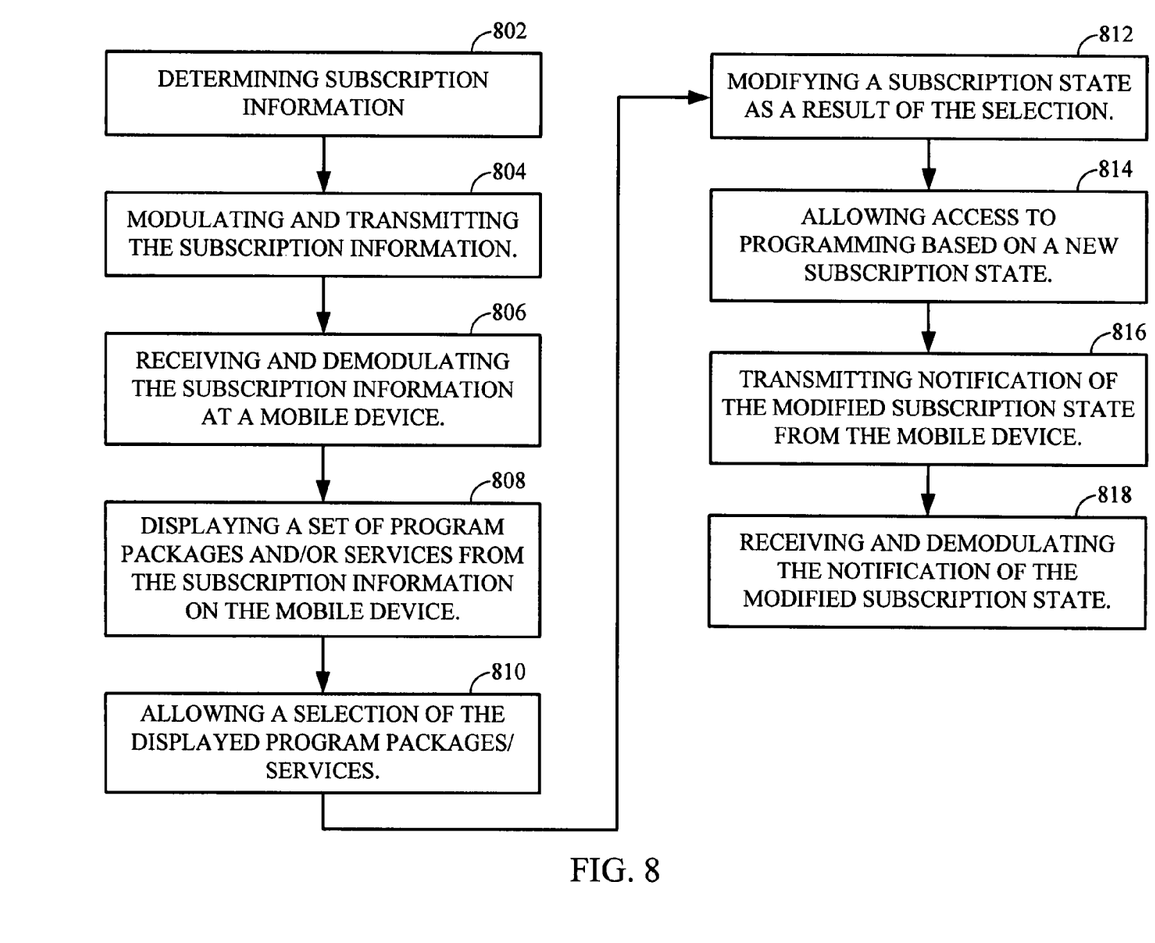
FIG. 8 is a flow diagram of one example of a method for modifying a subscription to media services at a mobile device.

FIG. 8 is a flow diagram of one example of a method for modifying a subscription to media services at a mobile device. The method for modifying subscription to media services 800 begins with determining subscription information, step 802. A set of program packages and individual services, along with associated cost of service data, forms the basis for the subscription information. The subscription information can also include auto-subscribe packages, banners and other marketing information, trees, tiers and application software. A service provider using determining means such as a server component 204 of FIG. 2 determines the subscription information. The determination of the subscription information can be based on factors, such as, for example, a geographic location of a subscriber billing address, a geographic location of the mobile device at the time of initiating a service, an area code of the mobile device, a median income of the subscriber area, a subscription state of the mobile device, a number of mobile devices operating in an area, and so forth. The subscription information can contain hierarchical subscription trees as described above with respect to FIGS. 6 and 7, a la cart packages, auto-subscribe packages, and associated cost of service. In addition, a subscribed program package can be blocked from display at the remote device. A program package, such as the auto-subscribe package, can be non-cancelable. Subscription information will be periodically revised and the mobile device will receive a revised application program or updated program packages, services and cost of service instructions.

At step 804, the subscription information is modulated and transmitted to a mobile device according to wireless scheme means such as the CDMA network 212 of FIG. 2. Other wireless schemes can be used, such as, for example, CDMA, CDMA 2000, GSM, WCDMA, GSM/GPRS/WCDMA, TDMA, TDMA/EDGE and TETRA. The service provider using modulating and transmitting means such as a server component 204 of FIG. 2 performs step 804. At step 806, the subscription information is received and demodulated at a mobile device, such as the mobile device 100 of FIG. 1. The subscription information is received by antenna means such as the antenna module 110 of FIG. 1. The subscription information is demodulated according to a wireless scheme such as the CDMA network using microprocessor means such as the microprocessor modules 108 of FIG. 1 and memory means such as the memory modules 102 of FIG. 1. The method 800 can be practiced by such mobile devices 100 as, for example, a PDA, a cell phone or a personal media player.

At step 808, the subscription information is displayed at the remote device, by displaying means such as display module 104 of FIG. 1. In addition, a current subscription state can be requested and displayed along with associated cost of services. At step 810, the mobile device allows a selection of the displayed subscription information, such as, for example, a program package and/or a service. The selections are accomplished by input means such as the input module 106 of FIG. 1. As a result of the selection, the subscription is modified, step 812. After the modification is accomplished at the remote device, access to program packages and service associated with the new subscription state is allowed without involvement of a customer service representative, step 814. There can be variations to this modification of subscription state by selection, such as, for example, after selection a later confirmation step can be required at the input module 106 before the subscription is modified or a period of time will expire before the modification is triggered, step 812.

Once the modification process is complete, information about the modified subscription state is transmitted by a mobile device, such as the mobile device 100 of FIG. 1. The modified subscription state information, which can be in the form of a notification, is modulated according to wireless scheme means such as the CDMA network and transmitted by antenna means such as the antenna module 110 from FIG. 1. At step 818, the modified subscription state information, or notification thereof, is received at receiving means, such as the server component 204 of FIG. 2.

In one example, a software application installed on a mobile device 100 (FIG. 1) allows a media program guide to be initiated. This begins an activation process that registers the mobile device 100 with the media distribution system 200 (FIG. 2). This registration begins the process to allow the mobile device 100 to subscribe and/or unsubscribe to available media services. Subscription information can be transferred to the remote device by an Original Equipment Manufacturer (OEM) in the form of software applications. Alternatively, the mobile device 100 can later accept a wireless transfer of software applications and/or subscription information using an Application Download Server (ADS).

As determined by the content providers and/or the service provider, not all media services available to the service provider are available to the subscriber. The mobile device may be denied access to some packages or to some services grouped within a package that other mobile devices can subscribe. For instance, some services may be temporarily unavailable to the remote device for specific reasons, such as a local sports game blackout. A set of packages and associated costs that are available to a subscriber are displayed at the mobile device although some packages can be blocked from display. This subscription information can be routinely revised through subsequent wireless transfers.

In one example, the mobile device has successfully activated the media service and a latest Media Program Guide, Marketplace Definitions, Barker Presentations (advertisements), and other related System Information, is transferred as an auto-subscribe package. Since transferring this information can take time, the mobile device can display an indication as to when the above information will be available. It may be required to have a subscription to a root package, such as the auto-subscribe package, before subscribing to any selected add-on package(s), i.e., a cost package, is allowed.

For clarity, services, packages, tiers and trees are discussed in the example, however, it should be appreciated that any combination of media segments and interrelationships between the media segments are possible and aspects of the embodiment should not be seen as limited to those discussed.

Aspects of the disclosed examples include, but are not limited to, the descriptions below.

A wireless communication method for modifying a subscription that includes receiving subscription information, demodulating the subscription information according to a wireless scheme, displaying a set of program packages for subscription using the demodulated subscription information, and allowing a selection of one or more displayed packages from the set, wherein the subscription is modified as a result of the selection.

An electronic device capable of modifying a subscription that is configured to receive subscription information, demodulate the subscription information according to a wireless scheme, display a set of program packages for subscription using the demodulated subscription information, and allow a selection of one or more displayed packages from the set, wherein the subscription is modified as a result of the selection.

An apparatus for wireless communication that includes means for receiving subscription information, means for demodulating the subscription information according to a wireless scheme, means for displaying a set of program packages for subscription using the demodulated subscription information, and means for allowing a selection of one or more displayed packages from the set, wherein the subscription is modified as a result of the selection.

A computer-readable medium embodying means for causing a computer to execute a method that includes receiving subscription information, demodulating the subscription information according to a wireless scheme, displaying a set of program packages using the demodulated subscription information, displaying a cost of services for the program packages using the demodulated subscription information, allowing a selection of one or more program packages from the set, wherein the subscription is modified as a result of the selection, displaying a new cost of service based on the modified subscription, and suppressing display of a package as a result of the selection of one or more packages.

A wireless communication method for modifying a subscription that includes determining subscription information, modulating the subscription information according to a wireless scheme, transmitting the modulated subscription information to a mobile device, wherein the subscription information is used at the mobile device to modify a subscription state, and receiving from the mobile device, modified subscription state information.

An electronic device for supporting subscription modification that is configured to determine subscription information, modulate the subscription information according to a wireless scheme, transmit the modulated subscription information to a mobile device, wherein the subscription information is used at the mobile device to modify a subscription state, and receive from the mobile device, modified subscription state information.

A wireless communication apparatus that includes means for determining subscription information, means for modulating the subscription information according to a wireless scheme, means for transmitting the modulated subscription information to a mobile device, wherein the subscription information is used at the mobile device to modify a subscription state, and means for receiving from the mobile device, modified subscription state information.

A computer-readable medium embodying means for causing a computer to execute a method that includes determining subscription information, determining a cost of service associated with the subscription information, modulating the subscription information according to a wireless scheme, transmitting the modulated subscription information to a mobile device, wherein the subscription information is used at the mobile device to modify a subscription state, receiving from the mobile device, modified subscription state information, modulating new subscription information, and transmitting the new subscription information.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A wireless communication method for modifying a subscription, comprising:

wirelessly receiving on a mobile device subscription information describing a plurality of program packages and relationships between the plurality of program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:

is referenced by the first program package but does not itself reference any of the plurality of program packages;

is automatically installed on the mobile device and not removable from the mobile device; and provides no media services;

determining on the mobile device a set of program packages available for selection based on the relationships between the plurality of program packages;

displaying on the mobile device the set of program packages determined to be available for selection; and receiving on the mobile device a selection of one or more displayed program packages from the set of program packages determined to be available for selection, wherein the subscription is modified as a result of the selection.

2. The method of claim 1, further comprising:
modifying on the mobile device the displayed set of program packages as a result of the selection of one or more of the displayed program packages.

3. The method of claim 1, further comprising:
receiving on the mobile device cost of service data with the subscription information; and
displaying on the mobile device a cost of service associated with at least one of the displayed program packages.

4. The method of claim 1, wherein the auto-subscribe package provides basic services to initiate additional subscriptions.

5. The method of claim 1, further comprising:
allowing access to selected program packages on the mobile device in accordance with the modified subscription.

6. The method of claim 1, further comprising communicating with the mobile device by a network scheme chosen from the group consisting of CDMA, CDMA 2000, GSM, WCDMA, GSM/GPRS/WCDMA, TDMA, TDMA/EDGE and TETRA.

7. The method of claim 1, wherein the relationships further include a second reference from the second program package to a third program package including at least the first and second services and a third service, the second reference indicating that a subscription to the second program package is required prior to the third program package being determined as available for subscription.

8. The method of claim 2, wherein modifying on the mobile device the displayed set of program packages further comprises:
suppressing on the mobile device display of a package as a result of the selection of one or more of the displayed program packages.

9. The method of claim 3, further comprising:
displaying a current subscription state on the mobile device;
receiving on the mobile device the selection of a program package wherein the selection adds or cancels the program package from the current subscription state; and
displaying a new cost of service associated with the selection on the mobile device.

10. An electronic device capable of modifying a subscription over a wireless network, comprising:
a memory; and
a processor coupled to the memory, wherein the processor is configured with processor-executable instructions to perform operations comprising:
receiving subscription information describing a plurality of program packages and relationships between the plurality of program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:
is referenced by the first program package but does not itself reference any of the plurality of program packages;
is automatically installed on the electronic device and not removable from the electronic device; and
provides no media services;
determining a set of program packages available for selection based on the relationships between the plurality of program packages;
displaying the set of program packages determined to be available for selection; and
receiving a selection of one or more displayed program packages from the set of program packages determined to be available for selection, wherein the subscription is modified as a result of the selection.

11. The electronic device of claim 10, wherein the processor is configured with processor-executable instructions to perform operations further comprising modifying the displayed set of program packages as a result of the selection of one or more of the displayed program packages.

12. The electronic device of claim 10, wherein the processor is configured with processor-executable instructions to perform operations further comprising:
receiving cost of service data with the subscription information; and
displaying a cost of service associated with at least one of the displayed program packages.

13. The electronic device of claim 10, wherein the processor is configured with processor-executable instructions to perform operations further comprising displaying a cost of service associated with at least one of the displayed available program packages.

14. The electronic device of claim 10, wherein the auto-subscribe package provides basic services to initiate additional subscriptions.

15. The electronic device of claim 10, wherein the processor is configured with processor-executable instructions to perform operations further comprising allowing access to selected program packages in accordance with the modified subscription.

16. The electronic device of claim 10, wherein the processor is configured with processor-executable instructions to perform operations further comprising communicating by a network scheme chosen from the group consisting of CDMA, CDMA 2000, GSM, WCDMA, GSM/GPRS/WCDMA, TDMA, TDMA/EDGE and TETRA.

17. The electronic device of claim 10, wherein the relationships further include a second reference from the second program package to a third program package including at least the first and second services and a third service, the second reference indicating that a subscription to the second program package is required prior to the third program package being determined as available for subscription.

18. The electronic device of claim 11, wherein the processor is configured with processor-executable instructions to perform operations further comprising suppressing display of a package as a result of the selection of one or more of the displayed program packages.

19. The electronic device of claim 13, wherein the processor is configured with processor-executable instructions to perform operations further comprising:
displaying a current subscription state;
receiving the selection of a program package, wherein the selection adds or cancels the program package from the current subscription state; and
displaying a new cost of service associated with the selection.

20. An apparatus for wireless communication, comprising:
means for wirelessly receiving subscription information describing a plurality of program packages and relationships between the plurality of program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:
  is referenced by the first program package but does not itself reference any of the plurality of program packages;
  is automatically installed on the apparatus and not removable from the apparatus; and
  provides no media services;
means for determining a set of program packages available for selection based on the relationships between the plurality of program packages;
means for displaying the set of program packages determined to be available for selection; and
means for receiving a selection of one or more displayed program packages from the set of program packages determined to be available for selection, wherein the subscription is modified as a result of the selection.

21. The apparatus of claim 20, further comprising:
means for receiving cost of service data for the set of available program packages; and
means for displaying the cost of service associated with at least one of the set of available program packages.

22. The apparatus of claim 20, further comprising:
means for suppressing display of a package as a result of the selection of one or more of the displayed program packages.

23. The apparatus of claim 20, further comprising:
means for modifying the displayed set of program packages as a result of the selection of one or more of the displayed program packages.

24. The apparatus of claim 20, further comprising:
means for receiving cost of service data with the subscription information; and
means for displaying a cost of service associated with at least one of the displayed program packages.

25. The apparatus of claim 20, wherein the auto-subscribe package provides basic services to initiate additional subscriptions.

26. The apparatus of claim 20, further comprising:
means for communicating by a network scheme chosen from the group consisting of CDMA, CDMA 2000, GSM, WCDMA, GSM/GPRS/WCDMA, TDMA, TDMA/EDGE and TETRA.

27. The apparatus of claim 20, wherein the relationships further include a second reference from the second program package to a third program package including at least the first and second services and a third service, the second reference indicating that a subscription to the second program package is required prior to the third program package being determined as available for subscription.

28. The apparatus of claim 21, further comprising:
means for allowing access to selected program packages in accordance with the modified subscription.

29. The apparatus of claim 28, further comprising:
means for determining a new cost of service after modifying a current subscription state;
means for displaying a new current subscription state; and
means for displaying the new cost of service.

30. A non-transitory processor-readable storage medium having stored thereon processor-executable software instructions configured to cause a processor operating on a mobile device to perform operations for modifying a subscription, the operations comprising:
  wirelessly receiving subscription information describing a plurality of program packages and relationships between the program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:
    is referenced by the first program package but does not itself reference any of the plurality of program packages;
    is automatically installed on the mobile device and not removable from the mobile device; and
    provides no media services;
  determining a set of program packages available for selection based on the relationships between the plurality of program packages;
  displaying the set of program packages determined to be available for selection along with costs associated the set of program packages; and
  receiving a selection of one or more displayed program packages from the set of program packages determined to be available for selection, wherein the subscription is modified as a result of the selection.

31. The non-transitory processor-readable storage medium of claim 30, wherein the stored processor-executable software instructions are configured to cause a processor to perform operations further comprising:
  displaying a new cost of service based on the modified subscription; and
  suppressing display of a package as a result of the selection of one or more packages.

32. The non-transitory processor-readable storage medium of claim 30, wherein the stored processor-executable software instructions are configured to cause the processor to perform operations further comprising:
  modifying the displayed set of program packages as a result of the selection of one or more of the displayed program packages.

33. The non-transitory processor-readable storage medium of claim 30, wherein the stored processor-executable software instructions are configured to cause the processor to perform operations further comprising:
  receiving cost of service data with the subscription information; and
  displaying a cost of service associated with at least one of the displayed program packages.

34. The non-transitory processor-readable storage medium of claim 30, wherein the auto-subscribe package provides basic services to initiate additional subscriptions.

35. The non-transitory processor-readable storage medium of claim 30, wherein the stored processor-executable software instructions are configured to cause the processor to perform operations further comprising:
  allowing access to selected program packages in accordance with the modified subscription.

36. The non-transitory processor-readable storage medium of claim 30, wherein the stored processor-executable software instructions are configured to cause the processor to perform operations further comprising:
communicating by a network scheme chosen from the group consisting of CDMA, CDMA 2000, GSM, WCDMA, GSM/GPRS/WCDMA, TDMA, TDMA/EDGE and TETRA.

37. The non-transitory processor-readable storage medium of claim 30, wherein the relationships further include a second reference from the second program package to a third program package including at least the first and second services and a third service, the second reference indicating that a subscription to the second program package is required prior to the third program package being determined as available for subscription.

38. A wireless communication method for modifying a subscription with a media core network, comprising:
compiling on the media core network subscription information including relationship information indicating relationships between a plurality of program packages, wherein the relationships include at least a first reference from a first program package including at least a first service to a second program package including at least the first service and second service, the first reference indicating that a subscription to the first program package is required prior to the second program package being determined as available for subscription, and wherein the subscription information includes an auto-subscribe package, wherein the auto-subscribe package:
is referenced by the first program package but does not itself reference any of the plurality of program packages;
is automatically installed on a mobile device and not removable from the mobile device; and
provides no media services;
wirelessly transmitting the subscription information from the media core network to the mobile device, wherein the subscription information is used at the mobile device to modify a subscription state; and
receiving from the mobile device, modified subscription state information at the media core network.

39. The method of claim 38, further comprising:
determining on the media core network the subscription information, at least in part based on information received from the mobile device.

40. The method of claim 38, wherein the relationship information comprises a hierarchical tree structure.

41. The method of claim 38, wherein the auto-subscribe package provides basic services to initiate additional subscriptions.

42. The method of claim 38, wherein the subscription information identifies one or more program packages that cannot be canceled at the mobile device.

43. The method of claim 38, wherein wirelessly transmitting comprises wirelessly transmitting via a wireless network that is chosen from the group consisting of CDMA, CDMA 2000, GSM, WCDMA, GSM/GPRS/WCDMA, TDMA, TDMA/EDGE and TETRA networks.

44. The method of claim 38, wherein the relationships further include a second reference from the second program package to a third program package including at least the first and second services and a third service, the second reference indicating that a subscription to the second program package is required prior to the third program package being determined as available for subscription.

45. The method of claim 40, wherein the subscription information further comprises program package subscription limitations based at least in part on geographic information.

46. The method of claim 39, further comprising:
receiving on the media core network a change to the subscription state from the mobile device; and
revising the subscription information on the media core network.

47. An electronic device for supporting subscription modification, comprising:
a memory; and
a processor coupled to the memory, wherein the processor is configured with process-executable instructions to perform operations comprising:
compiling subscription information including relationship information indicating relationships between a plurality of program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package,
wherein the auto-subscribe package:
is referenced by the first program package but does not itself reference any of the plurality of program packages;
is automatically installed on a mobile device and not removable from the mobile device; and
provides no media services;
wirelessly transmitting the subscription information to the mobile device, wherein the subscription information is used at the mobile device to modify a subscription state; and
receiving from the mobile device modified subscription state information.

48. The electronic device of claim 47, wherein the processor is configured with processor-executable instructions to perform operations further comprising determining the subscription information, in part based on information received from the mobile device.

49. The electronic device of claim 47, wherein the relationship information is in a form of hierarchical subscription trees of program packages.

50. The electronic device of claim 47, wherein the processor is configured with processor-executable instructions to perform operations such that the subscription information further comprises other information limiting subscription availability to program packages based in part on geographic information.

51. The electronic device of claim 47, wherein the processor is configured with processor-executable instructions to perform operations further comprising:
receiving a change to the subscription state from the mobile device; and
revising the subscription information.

52. The electronic device of claim 47, wherein the auto-subscribe package provides basic services to initiate additional subscriptions.

53. The electronic device of claim 47, wherein the processor is configured with processor-executable instructions to perform operations such that:
the subscription information identifies one or more program packages that cannot be canceled at the mobile device; and the subscription information identifies which package or set of packages will be suppressed from being displayed when a selection of one or more program packages is made.

54. The electronic device of claim 47, wherein the processor is configured with processor-executable instructions to perform operations further comprising communicating by a wireless scheme chosen from the group consisting of CDMA, CDMA 2000, GSM, WCDMA, GSM/GPRS/WCDMA, TDMA, TDMA/EDGE and TETRA.

55. The electronic device of claim 47, wherein the relationships further include a second reference from the second program package to a third program package including at least the first and second services and a third service, the second reference indicating that a subscription to the second program package is required prior to the third program package being determined as available for subscription.

56. A wireless communication apparatus, comprising:
means for compiling subscription information including relationship information indicating relationships between a plurality of program packages, wherein the relationships include at least a first reference from a first program package including at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:
is referenced by the first program package but does not itself reference any of the plurality of program packages;
is automatically installed on a mobile device and not removable from the mobile device; and
provides no media services;
means for wirelessly transmitting the subscription information to the mobile device, wherein the subscription information is used at the mobile device to modify a subscription state; and
means for receiving from the mobile device, modified subscription state information.

57. The apparatus of claim 56, wherein the relationship information includes hierarchical subscription information in a form of hierarchical subscription trees of program packages.

58. The apparatus oclaim 56, wherein the subscription information identifies which packagfe or set of packages will be suppressed from being displayed when a selection of one or more program packages is made.

59. The apparatus of claim 56, further comprising:
means for determining the subscription information, at least in part based on information received from the mobile device.

60. The apparatus of claim 56, further comprising:
means for receiving a change to the subscription state from the mobile device; and
means for revising the subscription information.

61. The apparatus of claim 56, wherein the auto-subscribe package provides basic services to initiate additional subscriptions.

62. The apparatus of claim 56, wherein the subscription information identifies one or more program packages that cannot be canceled at the mobile device.

63. The apparatus of claim 56, further comprising:
means for communicating by a wireless scheme chosen from the group consisting of CDMA, CDMA 2000, GSM, WCDMA, GSM/GPRS/WCDMA, TDMA, TDMA/EDGE and TETRA.

64. The apparatus of claim 56, wherein the relationships further include a second reference from the second program package to a third program package including at least the first and second services and a third service, the second reference indicating that a subscription to the second program package is required prior to the third program package being determined as available for subscription.

65. The apparatus of claim 57, wherein the subscription information further comprises information limiting subscription availability for program packages based in part on geographic information.

66. A non-transitory processor-readable storage medium having stored thereon processor-executable software instructions configured to cause a processor to perform operations for modifying a subscription, the operations comprising:
compiling subscription information including relationship information indicating relationships between a plurality of program packages, wherein the relationships including at least a first reference from a first program package include at least a first service to a second program package including at least the first service and a second service, the first reference indicating that a subscription to the first program package is required prior to the second program package being determined as available for subscription, and wherein the subscription information includes an auto-subscribe package, wherein the auto-subscribe package:
is referenced by the first program package but does not itself reference any of the plurality of program packages;
is automatically installed on a mobile device and not removable from the mobile device; and
provides no media services;
wirelessly transmitting the subscription information to the mobile device, wherein the subscription information is used at the mobile device to modify a subscription state; and
receiving from the mobile device, modified subscription state information.

67. The non-transitory processor-readable storage medium of claim 66, wherein the stored processor-executable software instructions are configured to cause a processor to perform operations such that the subscription information identifies which package or set of packages will be suppressed from being displayed when a selection of one or more program packages is made.

68. The non-transitory processor-readable storage medium of claim 66, wherein the stored processor-executable software instructions are configured to cause the processor to perform operations further comprising:
determining the subscription information, in part based on information received from the mobile device.

69. The non-transitory processor-readable storage medium of claim 66, wherein the stored processor-executable software instructions are configured to cause the processor to perform operations such that the relationship information is in a form of hierarchical subscription trees of program packages.

70. The non-transitory processor-readable storage medium of claim 66, wherein the stored processor-executable software instructions are configured to cause the processor to perform operations such that the subscription information further comprises other information limiting subscription availability to program packages based in part on geographic information.

71. The non-transitory processor-readable storage medium of claim 66, wherein the stored processor-executable software instructions are configured to cause the processor to perform operations further comprising:
receiving a change to the subscription state from the mobile device; and
revising the subscription information.

72. The non-transitory processor-readable storage medium of claim 66, wherein the auto-subscribe package provides basic services to initiate additional subscriptions.

73. The non-transitory processor-readable storage medium of claim 66, wherein the stored processor-executable software instructions are configured to cause the processor to perform operations such that the subscription information identifies one or more program packages that cannot be canceled at the mobile device.

74. The non-transitory processor-readable storage medium of claim 66, wherein stored processor-executable software instructions are configured to cause the processor to perform operations further comprising:
communicating by a wireless scheme chosen from a group consisting of CDMA, CDMA 2000, GSM, WCDMA, GSM/GPRS/WCDMA, TDMA, TDMA/EDGE and TETRA.

75. The non-transitory processor-readable storage medium of claim 66, wherein the relationships further include a second reference from the second program package to a third program package including at least the first and second services and a third service, the second reference indicating that a subscription to the second program package is required prior to the third program package being determined as available for subscription.

76. The apparatus of claim 24, further comprising:
means for displaying a current subscription state;
means for allowing the selection of a program package wherein the selection adds or cancels the program package from the current subscription state; and
means for displaying a new cost of service associated with the selection.

77. The non-transitory processor-readable storage medium of claim 32, wherein the stored processor-executable software instructions are configured to cause the processor to perform operations further comprising:
suppressing display of a package as a result of the selection of one or more of the displayed program packages.

78. The non-transitory processor-readable storage medium of claim 33, wherein the stored processor-executable software instructions are configured to cause the processor to perform operations further comprising:
displaying a current subscription state;
receiving the selection of a program package, wherein the selection adds or cancels the selected program package from the current subscription state; and
displaying a new cost of service associated with the selection.

\* \* \* \* \*